United States Patent
Gramenos et al.

(10) Patent No.: US 9,950,682 B1
(45) Date of Patent: Apr. 24, 2018

(54) CONTROL SYSTEM FOR REMOVABLE SEAT WITH INTEGRATED OCCUPANT RESTRAINT

(71) Applicant: Autoliv ASP, Inc., Ogden, UT (US)

(72) Inventors: James Gramenos, Bloomfield Hills, MI (US); George Evans, Salt Lake City, UT (US); Jackie Wang, Farmington, UT (US); Kevin Joseph Dewey, Shelby Township, MI (US); David Funnell, Windsor (CA); Christmann Xavier, Paris (FR)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 15/439,483

(22) Filed: Feb. 22, 2017

(51) Int. Cl.
| | |
|---|---|
| B60R 22/00 | (2006.01) |
| B60R 21/01 | (2006.01) |
| B60N 2/30 | (2006.01) |
| B60R 22/46 | (2006.01) |
| B60R 22/48 | (2006.01) |
| B60R 21/207 | (2006.01) |
| B60R 21/017 | (2006.01) |

(52) U.S. Cl.
CPC ............ *B60R 21/01* (2013.01); *B60N 2/3097* (2013.01); *B60R 21/017* (2013.01); *B60R 21/207* (2013.01); *B60R 22/46* (2013.01); *B60R 22/48* (2013.01); *B60R 2021/01211* (2013.01); *B60R 2021/01272* (2013.01); *B60R 2021/01286* (2013.01)

(58) Field of Classification Search
CPC ..... B60R 21/01; B60R 21/017; B60R 21/207; B60R 22/46; B60R 22/48; B60N 2/3097

USPC ............................................................. 701/45
See application file for complete search history.

(56) References Cited

U.S. PATENT DOCUMENTS

| | | | |
|---|---|---|---|
| 4,763,750 A * | 8/1988 | Yoshitsugu | B60R 22/04 180/268 |
| 5,785,347 A * | 7/1998 | Adolph | B60R 21/01556 180/273 |
| 6,400,259 B1 | 6/2002 | Bourcart et al. | |
| 2005/0150705 A1* | 7/2005 | Vincent | B60N 2/002 180/271 |
| 2005/0187685 A1* | 8/2005 | Kondo | B60R 21/013 701/45 |

FOREIGN PATENT DOCUMENTS

| | | |
|---|---|---|
| CN | 101885316 B | 5/2012 |
| DE | 10 2007 029 649 A1 | 1/2009 |
| DE | 10 2010 014 366 A1 | 11/2010 |

* cited by examiner

*Primary Examiner* — Muhammad Shafi
(74) *Attorney, Agent, or Firm* — Brinks Gilson & Lione (57) ABSTRACT

A motor vehicle occupant restraint system is provided. The system may include an occupant seat, a vehicle electronic control unit, a seat electrical circuit, and an electrical coupling between the vehicle electronic control unit and the seat electrical circuit. The occupant seat may have a mounting mechanism for enabling the seat to be removably mounted to a structural component of the motor vehicle, the occupant seat may further include at least one occupant restraint mechanism. The vehicle electronic control unit may be affixed to the motor vehicle for controlling the occupant restraint mechanism. The electronic coupling may utilize electrical conductors that are attached to and extend along the webbing of the seatbelt.

20 Claims, 9 Drawing Sheets

CONTROL SYSTEM FOR REMOVABLE SEAT WITH INTEGRATED OCCUPANT RESTRAINT

BACKGROUND

1. Field of the Invention

The present application relates generally to a control system for a removable seat with an integrated occupant restraint.

2. Description of Related Art

Certain benefits may be obtained by locating occupant restraint devices at various locations within the vehicle. For example, locating an airbag within a seat may provide advantages in terms of storage space and deployment orientation. However, some vehicles have removable seats and integration of occupant restraint devices into removable seats may present particular challenges related to at least sensing, power, and connectivity.

BRIEF SUMMARY

In satisfying the above need, as well as overcoming the drawbacks and other limitations of the related art, the present application provides a motor vehicle occupant restraint system. The system may include an occupant seat, a vehicle electronic control unit, a seat electrical circuit, and an electrical coupling between the vehicle electronic control unit and the seat electrical circuit.

The occupant seat may have a mounting mechanism for enabling the seat to be removably mounted to a structural component of the motor vehicle, the occupant seat may further include at least one occupant restraint mechanism, such as an inflatable occupant restraint or a seat belt pretensioner. The vehicle electronic control unit may be affixed to the motor vehicle for controlling the occupant restraint mechanism. The seat electrical circuit may be affixed to the occupant seat and connected with the occupant restraint mechanism. The electronic coupling between the vehicle electronic control unit and the seat electrical circuit may provide a control signal to activate the occupant restraint mechanism when the occupant seat is mounted to the motor vehicle. The electronic coupling may utilize electrical conductors that are attached to and extend along the webbing of the seatbelt.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

In the accompanying drawings the components are not necessarily to scale, emphasis instead being placed upon illustrating the principles of the application. Moreover, like reference numerals designate corresponding parts throughout the views.

DETAILED DESCRIPTION

Figure 1:
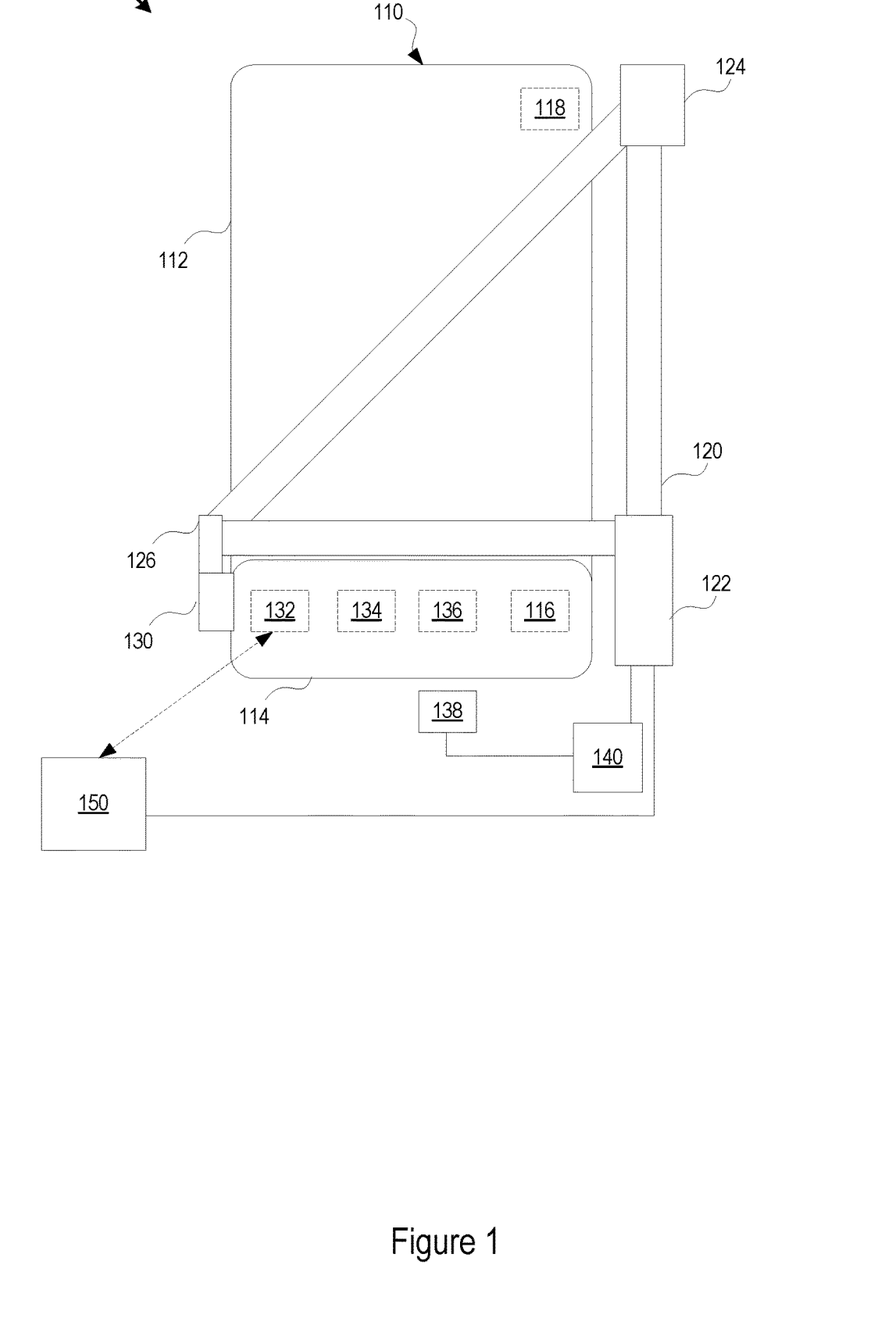
FIG. 1 is a block diagram of a system for deploying an airbag integrated into a removal seat.

FIG. 1 is a block diagram of a system 100 for deploying an occupant restraint in a removable seat 110. The removable seat 110 includes a back portion 112 and a bottom portion 114. One or more occupant restraints, for example airbags or seatbelt retractors, may be integrated into the seat 110. In one example, airbag 116 may be located in the bottom portion 114 of the seat 110 to protect the occupant's legs while deploying between the seat and door. In another example, a safety device such as an airbag 118 may be positioned to deploy between seat back and the door or side window of the vehicle.

Controlling and powering the safety devices located within the removable seat 110 may present various connectivity issues. Attachment of the removable seat 110 may be greatly complicated if the user is also required to attach a wire harness in addition to mechanically securing the removable seat 110. As such, various methodologies may be used to provide control and power signals to the removable seat 110. The vehicle may include a power supply 140 and a control unit 150 for controlling occupant restraints within the removable seat 110. Control and power signals may be provided to the removable seat 110 through conductors in the seatbelt 120. The system may include a seatbelt controller 122. The seatbelt controller 122 may include a seatbelt retractor and/or a pre-tensioner to provide tension to the seatbelt 120. The seatbelt may also include a rotatable coupler to maintain electrical connection while the belt is extended or contracted.

The seatbelt 120 may extend from the controller to an anchor unit 124. In other implementations, the seat belt may originate from the anchor unit 124. The anchor unit 124 may be attached to the vehicle for example, at a pillar between the side windows. In some implementations, the anchor unit 124 may include a seatbelt retractor to maintain tension on the seatbelt 120.

The seatbelt 120 may extend from the anchor unit 124 to a latch plate assembly 126. The latch plate assembly 126 may be configured to engage with and be locked into a buckle assembly 130. The buckle assembly 130 may be affixed to the removable seat 110, such that the buckle assembly 130 is removed with the removable seat. The seatbelt 120 may extend from the latch plate assembly 126 across the bottom portion 114 of the seat back to the seatbelt controller 122.

In some implementations, the seatbelt 120 may be formed of two separate belts. The seatbelt 120 may for example comprise a shoulder belt and a lap belt. The shoulder belt may extend from the anchor unit 124 to the latch plate assembly 126. The lap belt may extend between seat belt controller 122 and the latch plate assembly 126. The lap belt may experience significantly more stress during an impact than the shoulder belt. As such, the conductors may run along the shoulder belt and may be omitted from the lap belt. In some implementations, a first set of conductors may run along the shoulder belt and separately a second set of independent conductors may run along the lap belt. The first set of conductors and the second set of conductors may provide different power or control signals, or provide redundant power or control signals. In implementations where the lap belt and shoulder belt are separate, the lap belt and the shoulder belt may each have a separate retractor and/or rotatable coupler.

In some implementations, the seatbelt 120 may include conductors integrated into the webbing of the seatbelt 120. The conductors may be isolated from one another and carry discrete signals from the vehicle to the removable seat 110. For example, power may be provided to one or more of the conductors from a power supply 140. Similarly, control signals may be provided to one or more of the conductors by a controller 150. The power or control signals provided to the seat belt 120 may be transferred through the latch plate assembly 126 to the buckle assembly 130. Power received by the seat buckle assembly 130 may be provided to a control circuit 132 located on the removable seat 110.

Switch sensor may mechanically sense when the tongue of the latch plate assembly 126 is fully inserted into the buckle assembly 130. As such, an open circuit may be created by the mechanical movement of the switch. However, the electrical contacts on the latch plate assembly 126 making electrical connection with electrical contacts on the buckle assembly allow for detection of proper insertion though the closed circuit created by the contacts. The detection of seatbelt use and power connection from the seatbelt to the electronic control circuit may be used as a fail safe to disable deployment of an occupant restraint, such as an air bag, if the seat is not properly affixed to the vehicle and/or the seatbelt is not properly fastened.

The control circuit 132 may control deployment of the safety devices, for example airbag 116 and airbag 118, as well as other electronic functionality within the removable seat 110. The control circuit 132 may also control charging of the battery 134, as well as, other accessory functionality such as seat heating, seat cooling, or seat motion.

In some implementations, the controller 150 may provide control signals through the conductors in the seatbelt 120 to the removable seat 110. The control signals in the conductors of the seatbelt may be transferred to the buckle assembly 130 of the removable seat 110 through the latch plate assembly 126. In some implementations, the controller 150 may wirelessly communicate with the control circuit 132 in the removable seat to control deployment of the safety devices and/or other electronic functionality within the seat as described above. The seat may include a battery 134 which may be charged through power provided through the seatbelt 120.

In some implementations, the power supply 140 may be connected to the seat through an inductive coupling. The inductive coupling may be formed by a coil in a floor unit 138 placed under the seat and a coil the seat unit 136. Power may be provided through the inductive coupling either to directly deploy the safety devices or in some implementations to provide a power source to the control circuit 132 or battery 134. In such cases, the control circuit 132 may then be used to actuate safety devices as appropriate.

In some implementations, the seatbelt may provide power to other devices that interact with the seatbelt beyond just the removable seat. For example, the conductors in the seatbelt may be used to power seatbelt retractors, indicators, control electronics, or other elements in the anchor unit 126, the seat belt controller 122, the latch plate assembly 126, or the buckle assembly 130.

Figure 2:
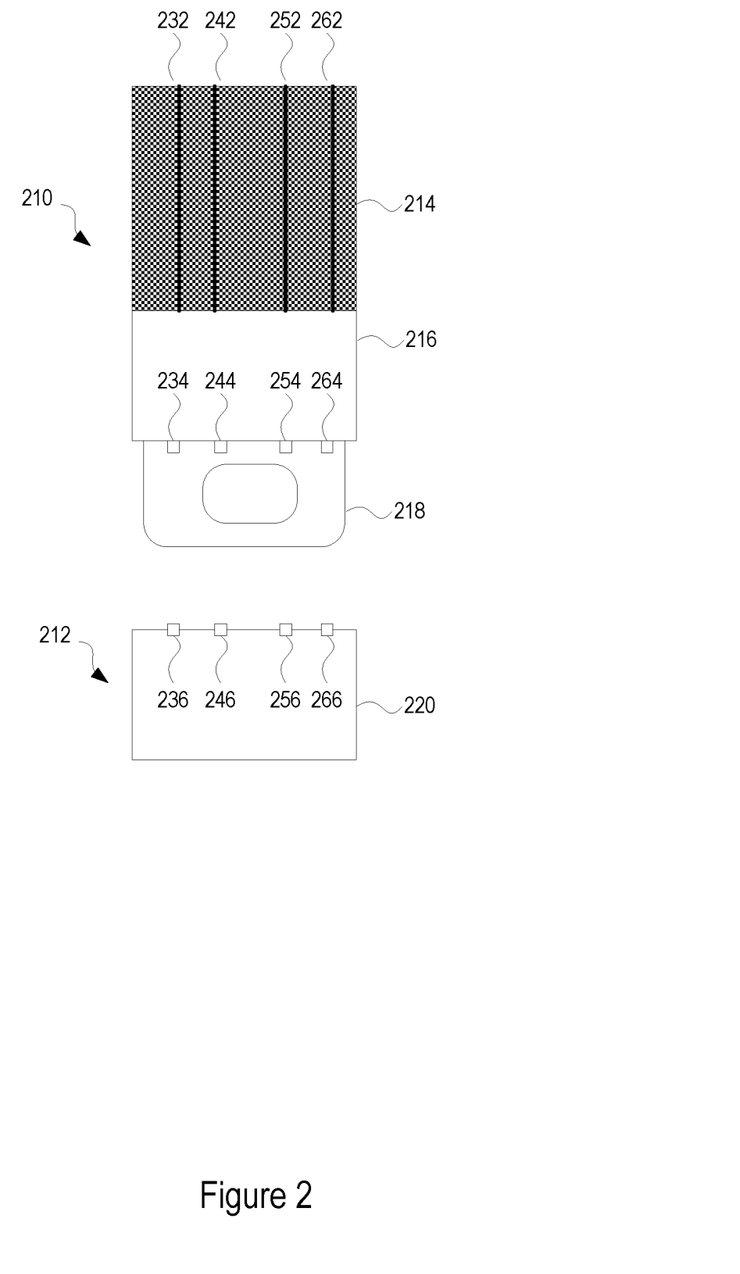
FIG. 2 is a diagram illustrating one implementation of a seatbelt and buckle that provide electrical connections to a removable seat.

FIG. 2 illustrates one implementation of a latch plate assembly and a buckle assembly for attaching the seatbelt to the seat. A latch plate assembly 210 may be configured to provide a locking engagement with a buckle assembly 212. The latch plate assembly 210 may include housing 216 and a tongue 218 extending from the housing 216. The latch plate assembly 210 may be securely connected to the seatbelt webbing 214. The tongue 218 may include a hole, notches, or other features that may be engaged by one or more locking features within the buckle assembly 212 to securely connect the seatbelt to the seat. The seatbelt webbing 214 may include multiple conductors (232, 242, 252, and 262). Each conductor may be electrically isolated from one another. The conductors may run along the surface of the seatbelt 214 or in some implementations may be woven into the seatbelt webbing 214. Each conductor (232, 242, 252, and 262) may form an electrical connection with a corresponding electrical contact (234, 244, 254, and 264) on the latch plate assembly 210. The electrical contacts may be provided on the surface of the housing 216, may be recessed into the surface of the housing 216, or may extend from the housing 216 and make contact with corresponding conductors (236, 246, 256, 266) on the buckle assembly 212 to provide electrical continuity from each conductor in the seatbelt 214 to components located within the seat, for example control circuitry, a battery, or safety deployment actuators.

Figure 3:
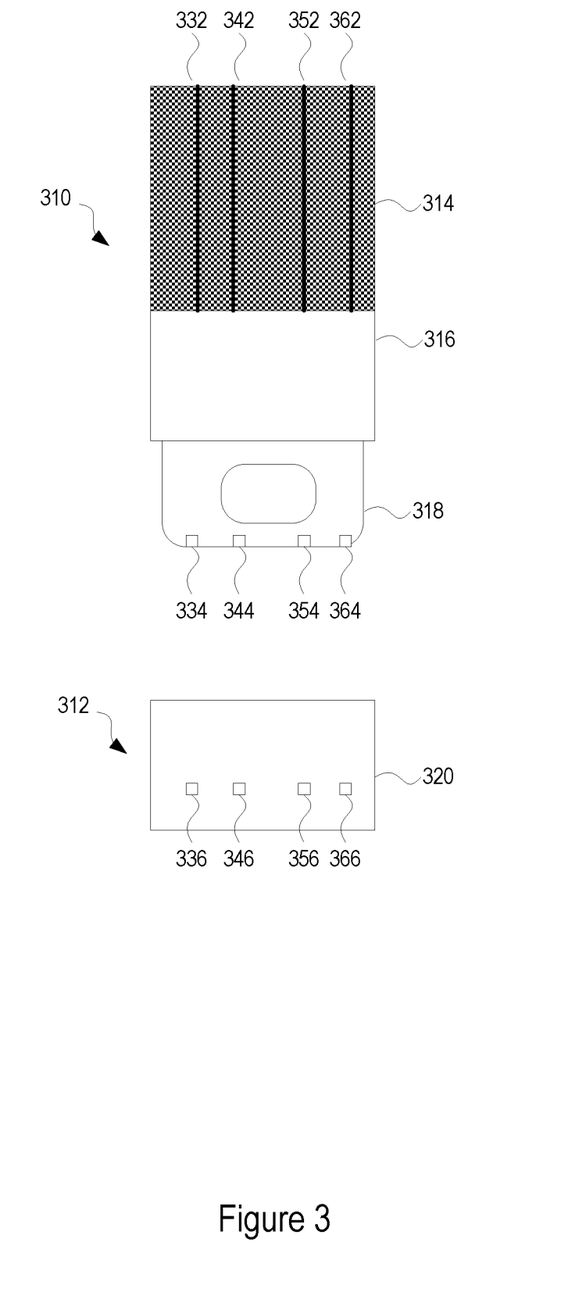
FIG. 3 is another implementation of a seatbelt and buckle for providing electrical communications to a removable seat.

FIG. 3 illustrates another implementation of a latch plate assembly and a buckle assembly for attaching the seatbelt to the seat. A latch plate assembly 310 may be configured to provide a locking engagement with a buckle assembly 312. The latch plate assembly 310 may include housing 316 and a tongue 318 extending from the housing 316. The latch plate assembly 310 may be securely connected to the seatbelt webbing 314. The tongue 318 may include a hole, notches, or other features that may be engaged by one or more locking features within the buckle assembly 312 to securely connect the seatbelt to the seat. The seatbelt webbing 314 may include multiple conductors (332, 342, 352, and 362). Each conductor may be electrically isolated from one another. The conductors may run along the surface of the seatbelt 314 or in some implementations may be woven into the seatbelt webbing 314. Each conductor (332, 342, 352, and 362) may form an electrical connection with a corresponding electrical contact (334, 344, 354, and 364) on the tongue 318 of the latch plate assembly 310. The electrical contacts may be provided on the surface of the tongue 318 or may extend from the tongue 318 and make contact with corresponding conductors (336, 346, 356, 366) inside the buckle assembly 312 to provide electrical continuity from each conductor in the seatbelt 314 to components located within the seat, for example control circuitry, a battery, or safety deployment actuators.

Figure 4:
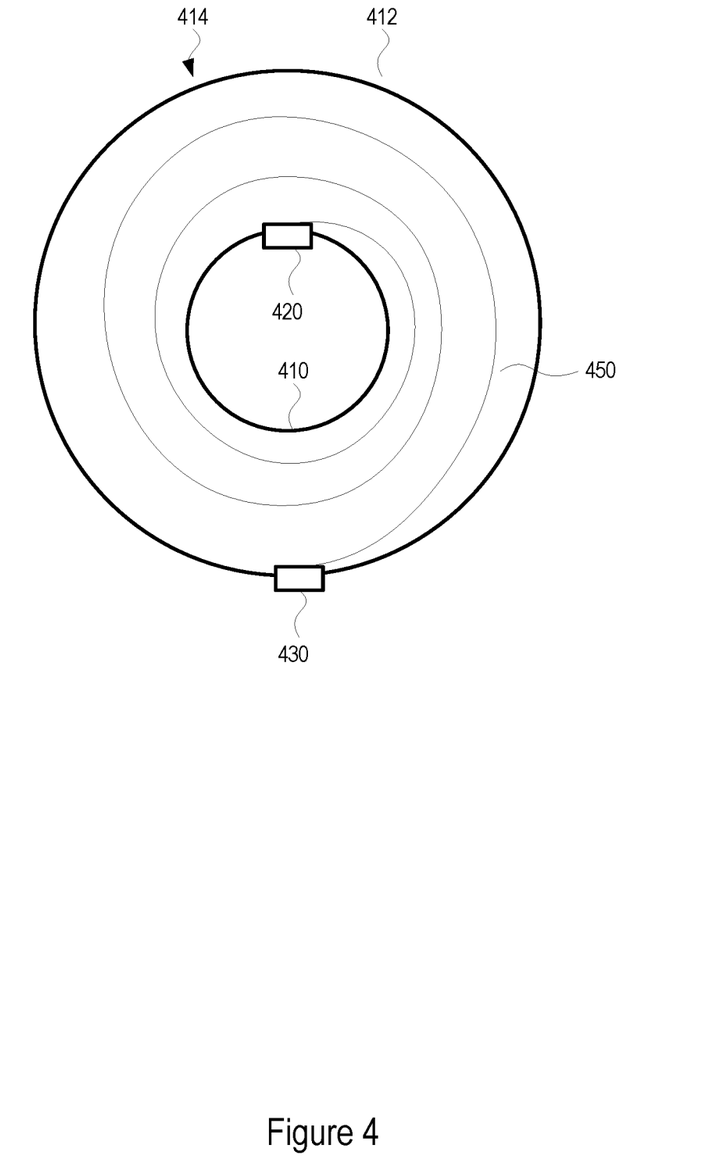
FIG. 4 is a cutaway view of a rotational coupler for a seatbelt.

FIG. 4 is diagram of a rotatable coupler assembly for providing electrical connections between vehicle components such as a controller or power supply and the seatbelt while the seatbelt extends or retracts. The rotatable coupler assembly 400 may include a first portion 410 including a first connector 420. The first connector 420 may be coupled to a wire harness that provides signals from the vehicle components such as a controller or power supply. The other side of the connector 420 may be connected to a cable for example, a ribbon cable 450. The ribbon cable 450 may be connected to a second connector 430 attached to second portion 412. The other side of the second connector 430 may be connected to conductors on the seatbelt to provide the signals from the ribbon cable to the removable seat. To facilitate the extension and retraction of the seatbelt to fit around the passenger, the first portion 410 may move or rotate with respect to the second portion 412. As such, the ribbon cable 450 may form a spiral between the first connector 420 and a second connector 430. Accordingly, as the first portion 410 rotates relative to the second portion 412, the spiral of ribbon cable will expand outwardly towards the second connector 430. To the contrary, when the first portion 410 is rotated in the opposite direction with regard to the second portion 412, the spiral will contract inwardly around the first connector 420.

In some implementations, the first portion 410 and second portion 412 may be circular. Further, the first portion 410 and the second portion 412 may interact to form a cavity where ribbon cable may be housed. The first portion 410 and the second portion 412 may form an inner hub where the first connector 420 may be located and an outer cover where the second connector 430 may be located.

Figure 5:
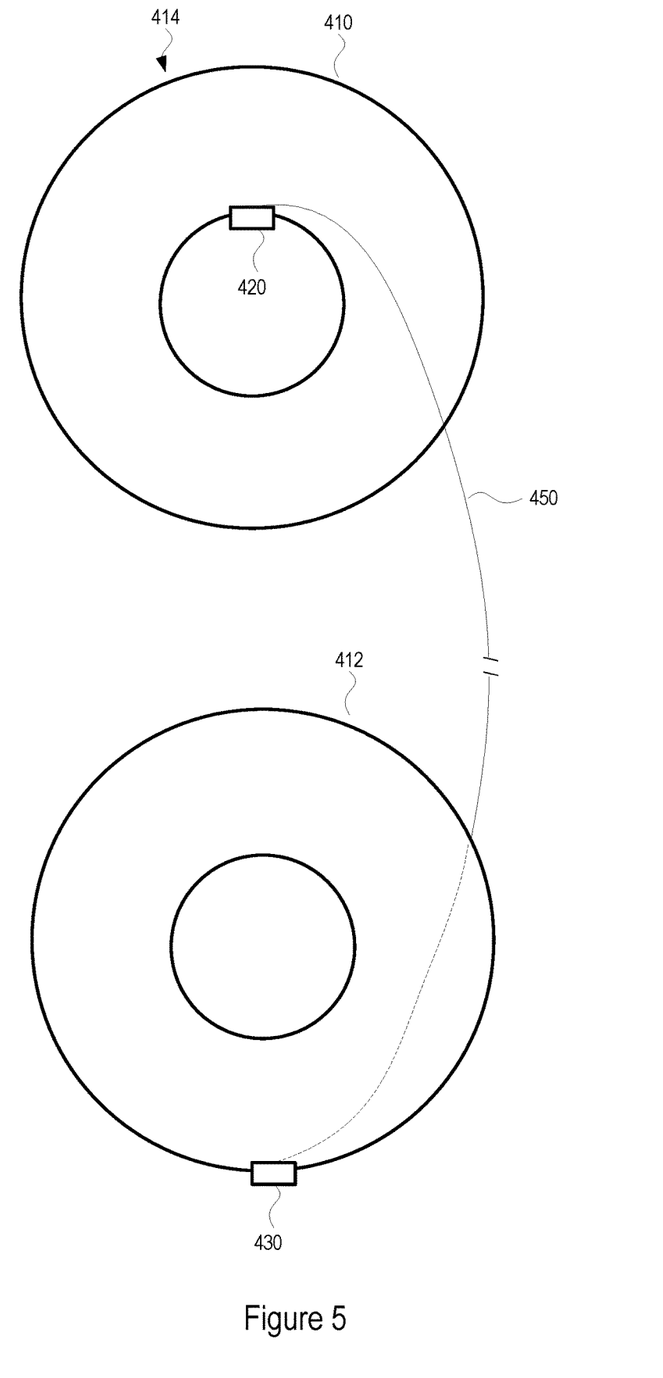
FIG. 5 is a disassembled view of a rotational coupler for a seatbelt according to FIG. 4.

FIG. 5 provides a disassembled view of the rotatable coupler assembly. The first portion 410 may be a disc with an inner hub where the first connector 420 is attached. The ribbon cable 450 may extend from the first connector 420 to the second connector 430 of the second portion 412. The length of the cable 450 may allow more than five rotations of the first portion 410 with respect to the second portion 412. In some implementations the length of cable 450 may allow between 10 and 15 rotations. As such, the ribbon cable 450 may be wound in a spiral between the first portion 410 and the second portion 412. Accordingly, the second portion 412 may be a disc that may be positioned concentrically with the first portion 410 when fully assembled, as shown in FIG. 4. In some configurations, the inner hub could use a brushed slip ring configuration to make the electrical connection with the outer ring to avoid using a cabled connection. In some implementations, the first connector 420 may be replaced with the latch plate and the ribbon cable may be replaced by seatbelt webbing as described.

Figure 6:
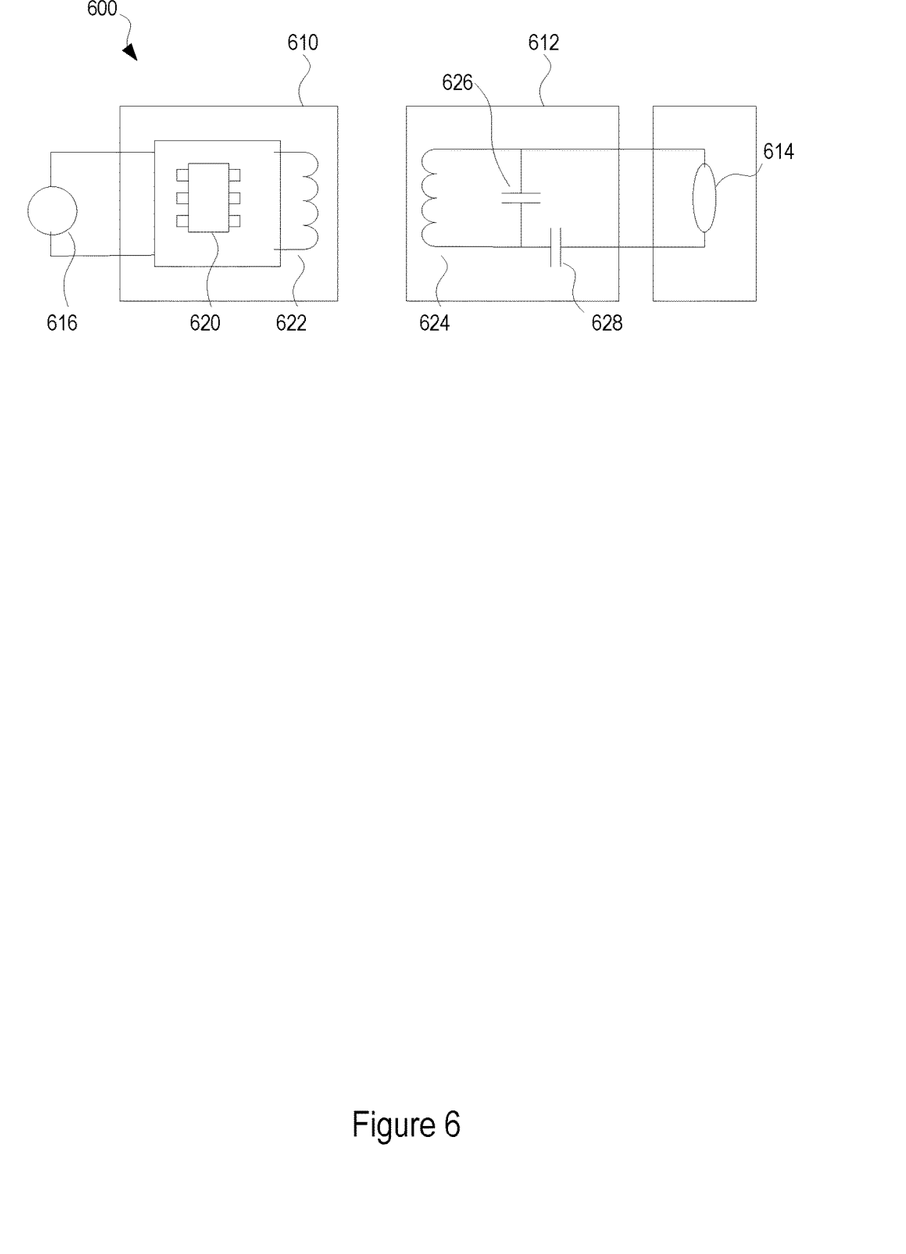
FIG. 6 is a schematic view of an inductive coupling between the vehicle and removable seat.

FIG. 6 is a block diagram of one implementation of an inductive coupling. The inductive coupling may use a floor unit 610 attached to the vehicle and a seat unit 612 attached to the removable seat. The floor unit includes control and power circuitry 620 to power a first inductor 622. The first inductor 622 may be aligned with and positioned adjacent to a second inductor 624 of the seat unit 612. Electromagnetic power may be emitted from the first inductor 622 to the second inductor 624 thereby generating wirelessly a power source within the removable seat. A capacitive element 626 may be provided in a parallel electrical connection with the second inductor 624. As such, a first end of the capacitive element 626 may be connected to a first output of the second inductor 624 and a second end of the capacitive element 626 may be connected to the second output of the second inductor 624. In addition, capacitive element 628 may be provided in electrical series connection with the second inductor 624. Further, a load such as an airbag 614 may be connected across the second inductor 624. In the implementation shown, the inductor 622 may be powered to initiate airbag deployment by providing power directly to the airbag assembly 614.

Figure 7:
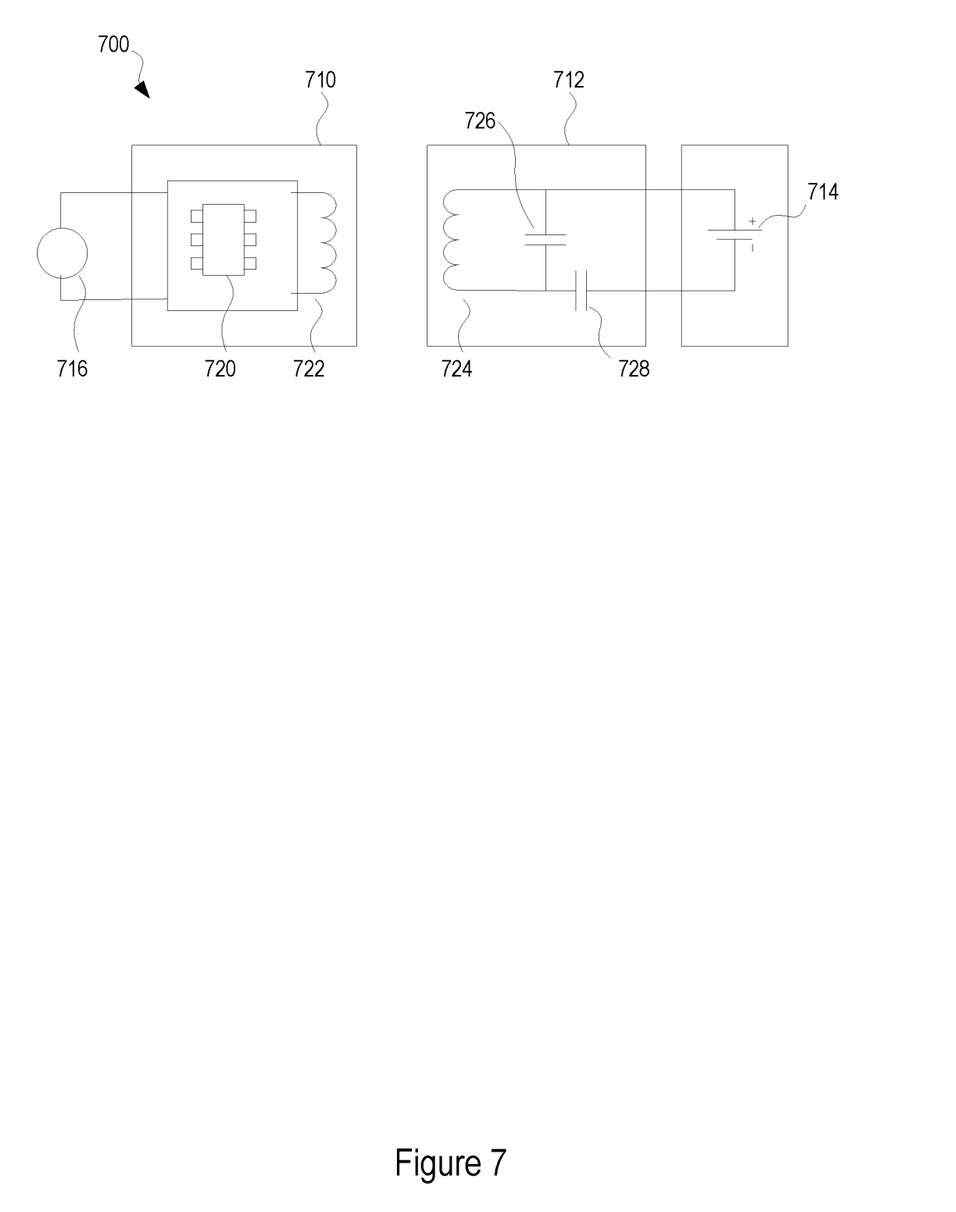
FIG. 7 is a schematic view of another implementation of an inductive coupling between the vehicle and removable seat.

FIG. 7 is a block diagram of another implementation of an inductive coupling. The inductive coupling may use a floor unit 710 attached to the vehicle and a seat unit 712 attached to the removable seat. The floor unit may include control and power circuitry 720 to power a first inductor 722. The first inductor 722 may be aligned with and positioned adjacent to a second inductor 724 of the seat unit 712. Electromagnetic power may be emitted from the first inductor 722 to the second inductor 724 thereby generating wirelessly a power source within the removable seat. A capacitive element 726 may be provided in a parallel electrical connection with the second inductor 724. As such, a first end of the capacitive element 726 may be connected to a first output of the second inductor 724 and a second end of the capacitive element 726 may be connected to the second output of the second inductor 724. In addition, capacitive element 728 may be provided in electrical series connection with the second inductor 724. Further, battery 714 or control circuitry may be connected across the second inductor 724. The battery 714 may be used to power control circuitry within the seat which then may be used to make deployment decisions on any occupant restraints integrated into the removable seat. In some implementations, the battery 714 may be used to provide power directly to the airbag assembly when initiated by control unit. In some implementations, a magnetic coupling may be utilized to secure or attach the floor unit 710 to the seat unit 712. Such magnetic coupling may help align the coupling and prevent interference due to vibration and other disturbances that may interfere with an efficient inductive coupling.

Figure 8:
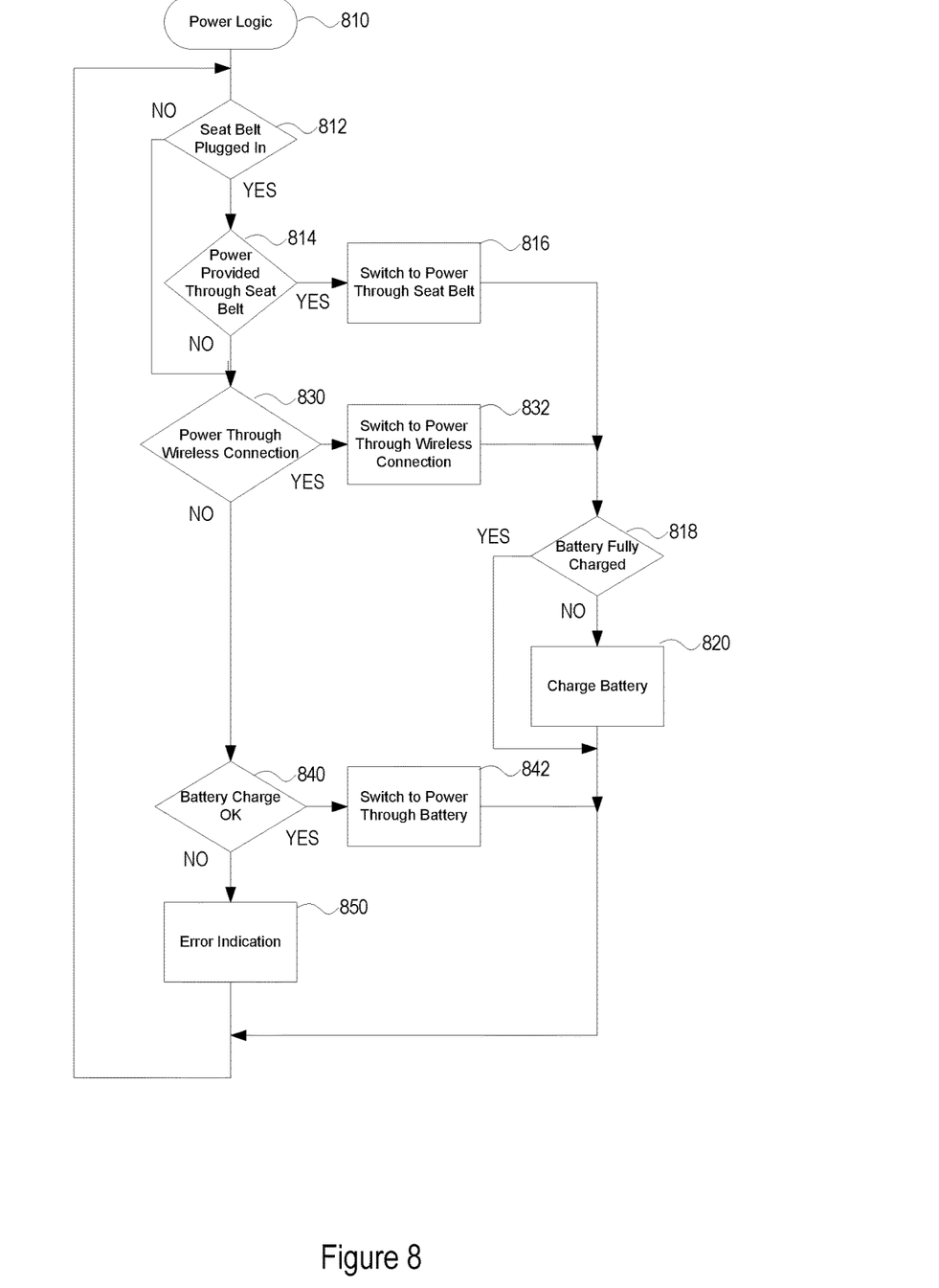
FIG. 8 is a flowchart illustrating a method for power control for the removable seat.

FIG. 8 is a flowchart illustrating the logic for controlling power in a removable seat. The power logic begins in block 810. In block 812, the system determines if the latch plate assembly is plugged into the seatbelt buckle assembly. If the seatbelt buckle is properly plugged in, the method continues to block 814. If the seatbelt buckle is not plugged in correctly, the method proceeds to block 830. In block 814, the system determines if power is provided through the seatbelt. If power is provided through the seatbelt, the method moves to block 816. In block 816, the electronics in the seat are switched to utilize the power through the seatbelt. The method then moves to block 818 where the system determines if the battery is fully charged. If the system determines that the battery is fully charged, the method reverts back to block 812 and the method is continued. If the battery is not fully charged, the electronics in the seat are configured to charge the battery as denoted in block 820 and the method proceeds to block 812 where the method is continued.

If power is not provided through the seatbelt in block 814, the method moves to block 830. In block 830, the system determines if power is provided through the wireless connection. For example, power can be provided through an inductive coupling between the vehicle and the removable seat. If the power is provided through the wireless connection, the process moves to block 832. In block 832, the seat electronics are configured to utilize power through the wireless connection. Then the method proceeds to block 818 and continues as previously described.

If power is not provided through the wireless connection in block 830, the process moves to block 840. In block 840, the system determines if the battery charge is operated at a sufficient level. This may be determined by performing current and/or voltage tests on the battery and determining if the battery charge is above a predetermined threshold level. If the battery charge is sufficient, the method proceeds to block 842. In block 842, the seat electronics are configured to use power from the battery. The method then proceeds to block 812, where the method continues as previously described.

If the battery charge is not sufficient in block 840, the method proceeds to block 850. In block 850, the system identifies an error condition that the battery is not charged to a sufficient level. The error condition may be entered into an error log within the vehicle. In some implementations, an error indictor such as a light or error message on the dashboard may be displayed to the driver identifying that the battery in the seat is not sufficiently charged.

Figure 9:
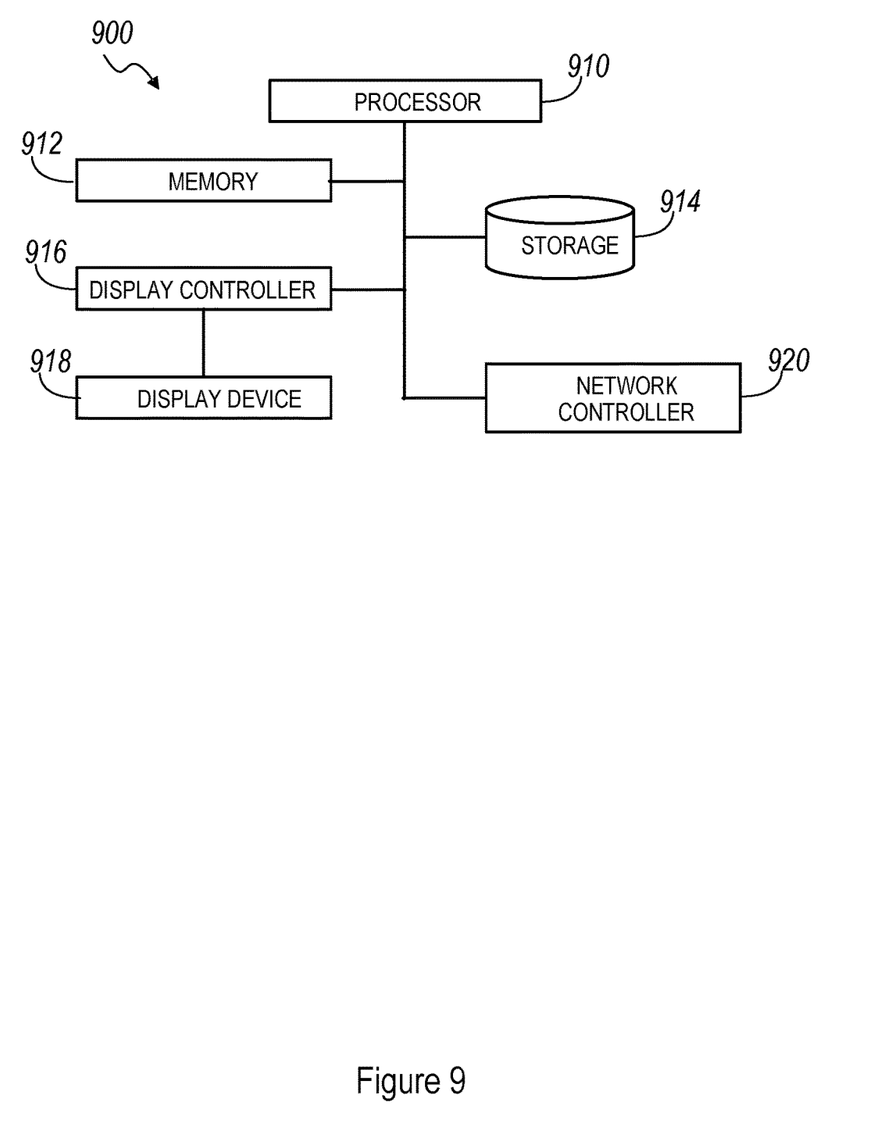
FIG. 9 is a block diagram of a control system for controlling the removable seat.

Any of the modules, controllers, servers, or engines described may be implemented in one or more computer systems. One exemplary system is provided in FIG. 9. The computer system 900 includes a processor 910 for executing instructions such as those described in the methods discussed above. The instructions may be stored in a computer readable medium such as memory 912 or storage devices 914, for example a disk drive, CD, or DVD. The computer may include a display controller 916 responsive to instructions to generate a textual or graphical display on a display device 918, for example a computer monitor. In addition, the processor 910 may communicate with a network controller 920 to communicate data or instructions to other systems, for example other general computer systems. The network controller 920 may communicate over Ethernet, WiFi, Bluetooth or other known protocols to distribute processing or provide remote access to information over a variety of network topologies, including local area networks, wide area networks, the Internet, or other commonly used network topologies.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this application. This description is not intended to limit the scope or application of this system in that the system is susceptible to modification, variation and change, without departing from spirit of this application, as defined in the following claims.

What is claimed is:

1. A motor vehicle occupant restraint system comprising;
an occupant seat having a mounting mechanism for enabling the seat to be removably mounted to a structural component of the motor vehicle, the occupant seat further having at least one occupant restraint mechanism in the form of at least one of an inflatable occupant restraint and a seat belt pre-tensioner,
a vehicle electronic control unit affixed to the motor vehicle for controlling the occupant restraint mechanism,
a seat electrical circuit affixed to the occupant seat and connected with the occupant restraint mechanism, and
an electronic coupling between the vehicle electronic control unit and the seat electrical circuit for providing a control signal to activate the occupant restraint mechanism when the occupant seat is mounted to the motor vehicle, the electronic coupling in the form of a plurality of first electrical conductors affixed to a seat belt assembly, the seat belt assembly including seatbelt webbing affixed to at least one seatbelt anchorage mounted to the motor vehicle, the seatbelt webbing affixed to a latch plate assembly, a buckle assembly affixed to the occupant seat having a plurality of first electrical conductors, the latch plate assembly being removably attached to the buckle assembly, the latch plate assembly including a plurality of second electrical conductors electrically connected with the seat electrical circuit, and the latch plate assembly and the buckle assembly having internal electrical contact elements for connecting the first and the second electrical conductors when the latch plate assembly and the buckle assembly are attached when the seat is mounted to the vehicle.

2. The motor vehicle occupant restraint system in accordance with claim 1, wherein the vehicle electronic control unit is configured to transmit control signals across the electronic coupling to the seat electrical circuit for deployment of the at least one occupant restraint.

3. The motor vehicle occupant restraint system in accordance with claim 1, further comprising a power supply affixed to the vehicle and electrically connected to the electronic coupling to power the seat electrical circuit.

4. The motor vehicle occupant restraint system in accordance with claim 1, further comprising a power supply connected to the electronic coupling to charge a battery located in the occupant seat.

5. The motor vehicle occupant restraint system in accordance with claim 4, wherein the seat electrical circuit is configured to utilize the battery to power deployment of the at least one occupant restraint if power is not provided through the electronic coupling.

6. The motor vehicle occupant restraint system in accordance with claim 1, wherein the electronic coupling further comprises a rotatable coupling electrically connected to one end of the seatbelt allowing extension and retraction of the seatbelt by rotating a first portion of the rotatable coupling relative to a second portion of the rotatable coupling.

7. The motor vehicle occupant restraint system in accordance with claim 1, wherein the seat belt assembly includes a shoulder belt and lap belt, where the shoulder belt is independent of the lap belt to isolate the shoulder belt from stress applied to the lap belt.

8. The motor vehicle occupant restraint system in accordance with claim 7, wherein electrical conductors in the shoulder belt are electrically isolated from the lap belt.

9. The motor vehicle occupant restraint system in accordance with claim 8, wherein electrical conductors in the shoulder belt are configured to provide redundant signals to the electrical conductors in the lap belt.

10. The motor vehicle occupant restraint system in accordance with claim 1, wherein the electronic coupling is in electrical connection with a seatbelt retractor to provide electrical power to operate the seatbelt retractor.

11. The motor vehicle occupant restraint system in accordance with claim 1, wherein the seat electrical circuit is configured to detect proper engagement of the latch plate assembly and the buckle assembly though a closed circuit formed by the electronic coupling.

12. The motor vehicle occupant restraint system in accordance with claim 11, wherein the seat electrical circuit is configured to disable deployment of the at least one occupant restraint unless proper engagement of the latch plate assembly and buckle assembly is detected.

13. A motor vehicle occupant restraint system comprising;
an occupant seat having a mounting mechanism for enabling the seat to be removably mounted to a structural component of the motor vehicle, the occupant seat further having at least one occupant restraint mechanism in the form of at least one of an inflatable occupant restraint and a seat belt pre-tensioner,
a vehicle electronic control unit affixed to the motor vehicle for controlling the occupant restraint mechanism,
a seat electrical circuit affixed to the occupant seat and connected with the occupant restraint mechanism, and
an electronic coupling between the vehicle electronic control unit and the seat electrical circuit for providing a control signal to activate the occupant restraint mechanism when the occupant seat is mounted to the motor vehicle.

14. The motor vehicle restraint system in accordance with claim 13 further comprising the electronic coupling further providing electrical power for the occupant restraint mechanism transmitted through the seat electrical circuit.

15. The motor vehicle restraint system in accordance with claim 13 further comprising the occupant seat further having an electrical energy storage component affixed to the seat for providing electrical power to the occupant restraint mechanism in the form of a battery or a capacitor, and wherein the electronic coupling is provided in the form of a wireless connection between the vehicle electronic control unit and the seat electrical circuit.

16. The motor vehicle restraint system in accordance with claim 13 further comprising the electronic coupling in the form of a plurality of first electrical conductors affixed to a seat belt assembly, the seat belt assembly including seatbelt webbing affixed to at least one seatbelt anchorage mounted to the motor vehicle, the seatbelt webbing affixed to a latch plate, a buckle affixed to the occupant seat having a plurality of first electrical conductors, the latch plate removably attached to the buckle, the latch plate including a plurality of second electrical conductors electrically connected with the seat electrical circuit, and the latch plate and the buckle having internal electrical contact elements for connecting the first and the second electrical conductors when the latch plate and the buckle are attached.

17. A motor vehicle restraint system in accordance with claim 13, further comprising the electronic coupling provided in the form of a first inductive coupling element mounted to the vehicle and a second inductive coupling element mounted to the seat, the first inductive coupling element and the second inductive coupling element positioned in mutual proximity when the seat is mounted to the vehicle, the first inductive coupling element and the second inductive coupling element transmitting electrical power and the control signal between the vehicle electronic unit and the seat electrical circuit.

18. A motor vehicle occupant restraint system comprising;
an occupant seat having a mounting mechanism for enabling the seat to be removably mounted to a structural component of the motor vehicle, the occupant seat further having at least one occupant restraint mechanism in the form of at least one of an inflatable occupant restraint and a seat belt pre-tensioner,
a vehicle electronic control unit affixed to the motor vehicle for controlling the occupant restraint mechanism,
a seat electrical circuit affixed to the occupant seat and connected with the occupant restraint mechanism, and
an electronic coupling between the vehicle electronic control unit and the seat electrical circuit for providing a control signal to activate the occupant restraint mechanism when the occupant seat is mounted to the motor vehicle, the electronic coupling in the form of a plurality of first electrical conductors affixed to a seat belt assembly, the seat belt assembly including shoulder belt and lap belt, the shoulder belt being affixed to a first seatbelt retractor mounted to the motor vehicle, the shoulder belt being affixed to a latch plate assembly, the lap belt being affixed to the latch plate assembly and a second seatbelt retractor mounted to the motor vehicle, a buckle assembly affixed to the occupant seat having a plurality of first electrical conductors, the latch plate assembly being removably attached to the buckle assembly, the latch plate assembly including a plurality of second electrical conductors electrically connected with the seat electrical circuit, and the latch plate assembly and the buckle assembly having internal electrical contact elements for connecting the first and the second electrical conductors when the latch plate assembly and the buckle assembly are attached when the seat is mounted to the vehicle.

19. The motor vehicle occupant restraint system in accordance with claim 18, wherein a rotatable coupler is electrically connected between the first electrical conductors and a power supply affixed to the vehicle allowing extension and retraction of the seatbelt.

20. The motor vehicle occupant restraint system in accordance with claim 19, wherein the rotatable coupler comprises a first connector affixed to a first portion of the rotatable coupler and a second connector affixed to a second portion of the rotatable coupler, the rotatable coupler further comprising a cable extending in a spiral between the first connector and the second connector such that rotation of the first portion relative to the second portion expands or contracts the spiral.

* * * * *